July 16, 1935.  J. L. SHERRITT  2,008,113
INSTRUMENT FOR LOCATING ANCHORS FOR TELEPHONE POLES AND THE LIKE
Filed March 13, 1934
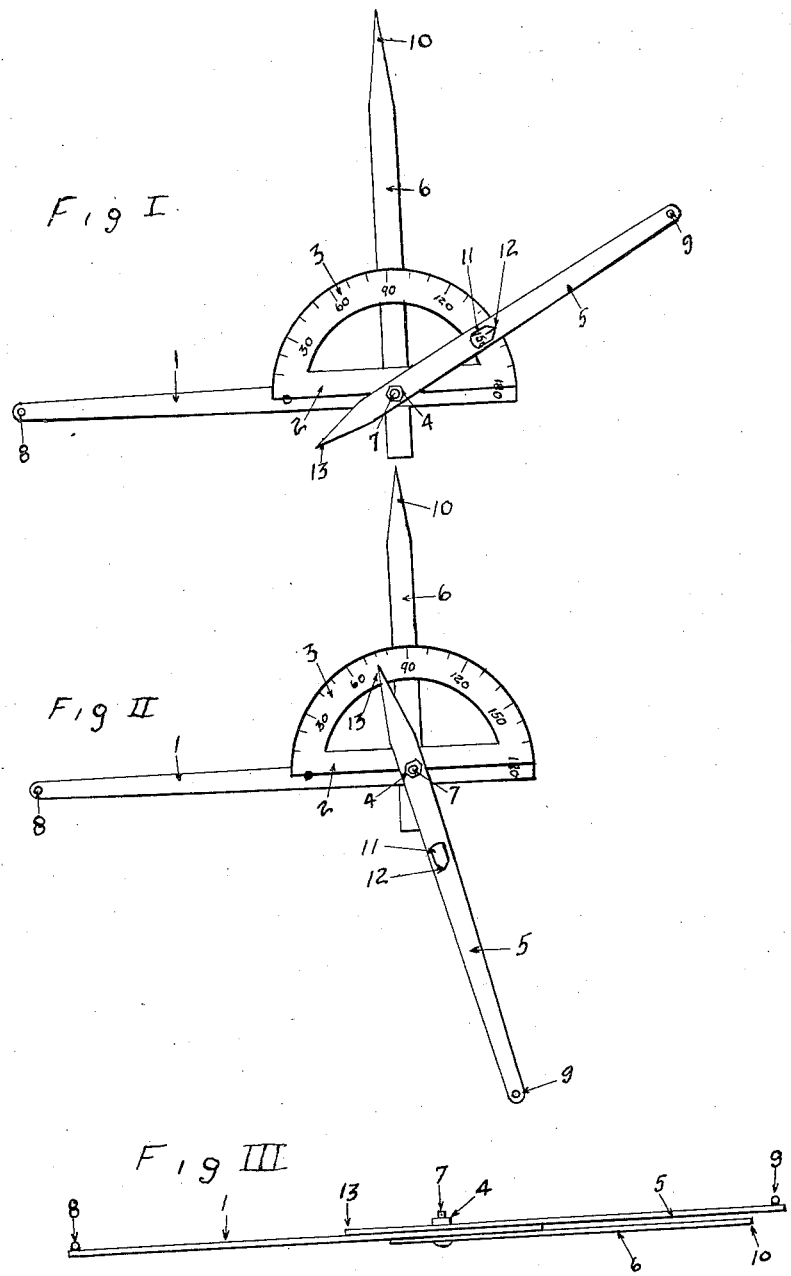
INVENTOR.
John L. Sherritt,
BY Arthur H. Ewald,
ATTORNEY.

Patented July 16, 1935

2,008,113

UNITED STATES PATENT OFFICE 2,008,113

INSTRUMENT FOR LOCATING ANCHORS FOR TELEPHONE POLES AND THE LIKE

John L. Sherritt, Montgomery, Ohio

Application March 13, 1934, Serial No. 715,321

4 Claims. (Cl. 33—64)

My invention relates to an instrument for the proper location of an anchor for a telephone or other similar pole occupying the apex of the angle formed by a series of such poles.

In the setting of telephone, telegraph or other similar poles where a pole occupies the apex of an angle formed by it between the laterally adjacent poles on each side, it becomes necessary to provide an anchor for such pole outside the included angle to enable it satisfactorily to sustain the tension and stress imposed at such angle by the wires carried by the several poles. In order to do this it is necessary to bisect the excluded angle formed by the three poles and to place the anchor at some suitable point on the line of bisection, guys being run from the anchor to the pole. This service may, of course, be accurately performed by means of engineering instruments now available, but the use of such instruments requires the services of experts for their handling, and further calls for an expenditure of time scarcely justified by the service to be rendered.

The principal object of the present invention is to provide a simple instrument for the location of such anchors, which instrument may be successfully and expeditiously used by men of such experience and training as are usually employed in the location and setting of the poles themselves.

Other objects of the invention will appear from the following detailed description thereof.

In the drawing:

Figure 1 is a plan view of an instrument constructed in accordance with this invention with the parts in position for measuring the included angle between poles.

Figure 2 is a similar view with the movable arm pointed to indicate location of the anchor for the pole at the apex of said angle.

Figure 3 is a side view of the device.

The numeral 1 indicates an arm to one end of which the base 2 of a semicircular scale 3 is permanently secured, said base being in alignment with the longitudinal axis of the arm. Pivotally mounted on a pin 4 located at the middle point of the base 2 are arms 5 and 6. The pin 4 is extended upwardly to form a sight 7, and the ends of arms 1 and 5 are provided with coordinating sights 8 and 9. The free end of arm 6 is provided with a point 10 by means of which it may be secured in the wood of a telephone or other similar pole with the scale 3 and arms 1 and 5 in horizontal, or substantially horizontal position, and with the arm 1 so pointed as to bring the next adjacent pole of the series on the corresponding side of the apex pole in alignment with the sights 7 and 8. Arm 5 is provided with an aperture 11 contaning an index 12 which moves over and is readable on the semicircular scale 3. The inner end of arm 5 is provided with an index pointer 13 movable over the scale 3.

The device having been attached to an apex pole with arm 1 positioned as hereinabove indicated, arm 5 is rotated over the scale so as to bring sight 9 when viewed over sight 7 in alignment with the next adjacent pole on the side opposite the apex from the pole indicated by arm 1. The included angle as calibrated on the semicircular scale 3 is then indicated by the index 12, the scale being read through the opening 11. The included angle having thus been ascertained, the arm 5 is rotated outwardly until the point 13 on its inner end reads upon the calibrated scale an angle which bisects the included angle previously ascertained. The line formed by the sights 7 and 9 then bisects the excluded angle and the operator by sighting over said sights is enabled to indicate accurately the point at which an anchor is to be set.

Having thus fully described my invention, what I claim as new and desire to secure by Letters Patent is:

1. A devise of the character specified comprising an arm, a semicircular scale secured with its base in alignment with the longitudinal axis of said arm, a second arm pivotally secured to the first arm at the middle point of said base, an index on said second arm readable on said scale through an aperture in said arm, an index point on the inner end of said second arm, and pivotal means for securing said arms and scale temporarily to a support in a substantially horizontal position.

2. A devise of the character specified comprising an arm, a semicircular scale secured with its base in alignment with the longitudinal axis of said arm, a second arm pivotally secured to the first arm at the middle point of said base, an index on said second arm readable on said scale through an aperture in said arm, an index point on the inner end of said second arm, and a third arm pivotally secured to the said arms at said middle point, the free end of said third arm being pointed, whereby the device may be temporarily secured to a permeable support in a substantially horizontal position.

3. A device of the character specified comprising an arm, a semicircular scale secured with its base in alignment with the longitudinal axis of said arm, a second arm pivotally secured to the first arm at the middle point of said base, an index on said second arm readable on said scale through an aperture in said arm, an index point on the inner end of said second arm, a sight at the pivotal center of said arms, a sight on each of said arms near its end and on the longitudinal axis thereof, and means for pivotally securing said arms and scale temporarily to a support in a substantially horizontal position.

4. A device of the character specified comprising an arm, a semicircular scale secured with its base in alignment with the longitudinal axis of said arm, a second arm pivotally secured to the first arm at the middle point of said base, an index on said second arm readable on said scale through an aperture in said arm, an index point on the inner end of said second arm, a sight at the pivotal center of said arms, a sight on each of said arms near its end and on the longitudinal axis thereof, and a third arm pivotally secured to said arms at said middle point, the free end of said third arm being pointed, whereby the device may be temporarily secured to a permeable support in a substantially horizontal position.

JOHN L. SHERRITT.